Dec. 9, 1958  J. W. CASEY  2,863,469
OIL TANK SAFETY VALVE
Filed June 12, 1956  2 Sheets-Sheet 1
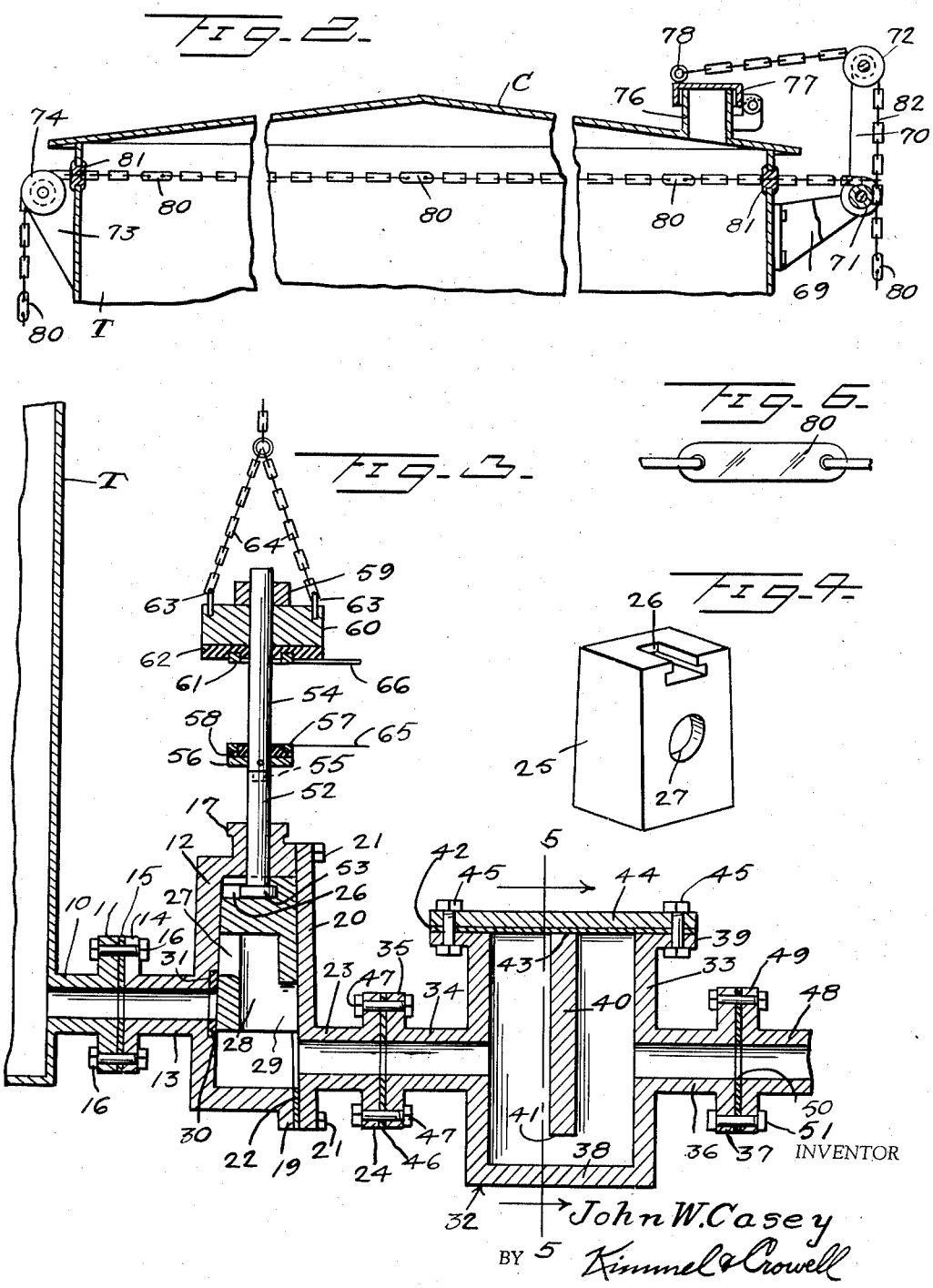
INVENTOR
John W. Casey
BY Kimmel & Crowell
ATTORNEYS Dec. 9, 1958 J. W. CASEY 2,863,469
OIL TANK SAFETY VALVE
Filed June 12, 1956 2 Sheets-Sheet 2
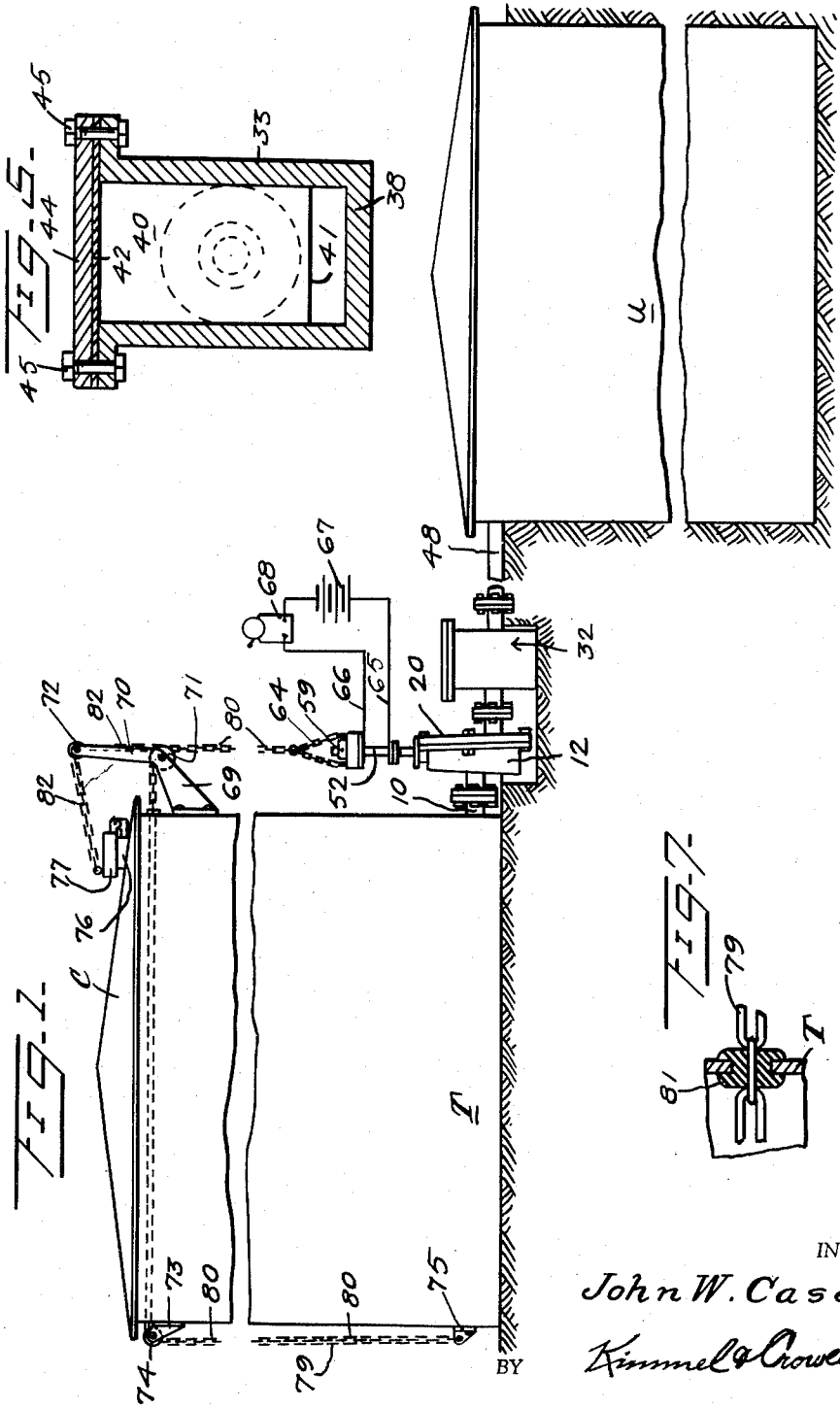
INVENTOR
John W. Casey
BY Kimmel & Crowell
ATTORNEYS

United States Patent Office 2,863,469
Patented Dec. 9, 1958

2,863,469

OIL TANK SAFETY VALVE

John W. Casey, Harlingen, Tex.

Application June 12, 1956, Serial No. 590,908

5 Claims. (Cl. 137—72)

The present invention relates to oil tank safety valves, and more particularly to such devices which are adapted to dump the contents of an oil tank when the tank catches on fire.

The primary object of the invention is to provide an oil tank safety valve mechanism which will automatically open a drainage line to permit the escape of the contents of the tank into an underground safety tank, and which will simultaneously open a vent valve in the top of the tank, both occurring upon the tank contents becoming ignited.

Another object of the invention is to provide an oil tank safety drainage system having means associated therewith for eliminating the passage of fire through the pipe of the system.

A further object of the invention is to provide a valve housing for the drainage valve in an oil tank safety system which will permit the valve to be easily assembled and disassembled for repairs without necessitating an excessively deep valve pit.

A still further object of the invention is to provide an oil tank safety drainage mechanism of the class described above which is inexpensive to manufacture, simple to install and maintain, and completely positive in its action.

Other objects and advantages will become apparent in the following specification when considered in the light of the attached drawings, in which:

Figure 1 is a side elevation of the invention shown partly broken away for clarity.

Figure 2 is an enlarged fragmentary vertical transverse cross-section illustrating the attachment of the invention to the top of an oil tank.

Figure 3 is a view similar to Figure 2 illustrating the valve mechanism and trap.

Figure 4 is a perspective view of the valve block.

Figure 5 is a vertical cross-section taken along the line 5—5 of Figure 3, looking in the direction of the arrows.

Figure 6 is an enlarged fragmentary side elevation of the operating chain illustrating one of the fusible links.

Figure 7 is an enlarged detail view similar to Figure 2 illustrating the seal for the chain at the point of passage thereof through the tank wall.

Referring now to the drawings in detail wherein like reference numerals indicate like parts throughout the several figures, the reference character T indicates generally an oil tank of conventional construction having a cover C affixed to the top thereof by any suitable means. The tank T has an outlet nipple 10 formed at the lower edge thereof and carrying at its outer extremity an attachment flange 11.

A generally rectangular upwardly tapering valve housing 12 is provided with an inlet nipple 13 having at its outer extremity an attachment flange 14 formed thereon. An annular gasket 15 formed of petroleum resistant flexible material is positioned between the flanges 11 and 14 and secured therein by means of flange clamping bolts 16.

The valve body 12 carries at its upper end a cylindrical boss 17 having a bore 18 extending vertically therethrough. A flange 19 extends around one side edge of the body 12 and is adapted to have secured thereto a cover plate 20 by means of attaching bolts 21. The cover plate 20 is provided with a gasket 22 positioned between the cover plate 20 and the flange 19.

An outlet nipple 23 having at its outer terminal ends an attachment flange 24 is integrally formed on the cover 20 so that the outlet nipple 23 is positioned substantially below the inlet nipple 13 on the body 12. A generally rectangular valve block 25 tapering upwardly slightly is formed with a T-shaped slot 26 in its upper end wall and has a port 27 positioned medially of the height thereof, as best seen in Figure 4. A vertical passage 28 extends axially upwardly within the block 25 and has a laterally offset extension 29 projecting through the side wall of the block 25 opposite the side wall thereof having the port 27 therein. The port 27, vertical passage 28, and lateral passage 29 are in communication with each other.

A compression seal ring 30 is mounted in the housing 12 in an annular groove 31 surrounding the inlet conduit 13 and is adapted to seal against the side of the valve block 25 to maintain the tank T in sealed relation when the valve block 25 is in the position illustrated in Figure 3. Obviously, movement of the valve block 25 downwardly in the valve housing 12 will align the inlet conduit 13 with the port 27 and the outlet conduit 23 with the lateral passage 29 permitting a flow of fluid through the valve block 25.

A trap, generally indicated at 32, includes a generally rectangular hollow body 33 having an inlet nipple 34 extending from one side thereof and having a flange 35 integrally formed on its outer terminal end. An outlet nipple 36 having an integral flange 37 formed on its outer terminal end is integrally formed on the body 33 in axial alignment with the nipple 34 at a point spaced from the bottom wall 38 of the body 33 and the top flange 39 thereof. A baffle 40 is integrally joined internally of the body 33 and extends transversely thereof at right angles to the axes of the inlet and outlet nipples 34 and 36, respectively.

The lower end 41 of the baffle 40 is spaced above the bottom wall 38 of the body 33 but terminates well below the inlet and outlet nipples 34 and 36, respectively. A petroleum resistant flexible seal 42 extends completely across the upper open side of the body 33 and the flange 39 engaging the top edge 43 of the baffle 40. A rectangular cover plate 44 is positioned in engaging relation to the seal 42 and is secured to the flanges 39 by flange bolts 45. An annular petroleum resistant flexible seal 46 is positioned between the flanges 24 and 35 and is secured therein by flange bolts 47.

An outlet conduit 48 has a flange 49 formed thereon and is positioned adjacent the flange 37 with an annular petroleum resistant flexible seal 50 positioned therebetween. Flange bolts 51 secure the flanges 37 and 49 together with the seal 50 lying therebetween.

An underground safety tank generally indicated at U is positioned in spaced relation to the tank T and is connected thereto by means of the conduit 48.

A valve stem 52 is formed of cylindrical cross-section and has an enlarged T-head 53 on its lower end which is adapted to be positioned within the T-slot 26 on the block 25 with the valve stem 52 extending upwardly through the boss 17. A valve stem extension 54 is secured to the upper end of the valve stem 52 by means of a screw coupling 55, as best illustrated in Figure 3.

A collar 56 is secured to the lower end of the valve stem extension 54 and has a contact ring 57 secured thereto but insulated therefrom by means of electrical insulation 58. The upper end of the valve stem extension 54 has a collar 59 detachably secured thereto and a weight 60 is positioned on the valve stem extension 54 between the collars 56 and 59.

The contact ring 61 is secured to the lower side of the weight 60 and insulated therefrom by means of electrical insulation 62. The weight 60 has attaching eyes 63 secured to its upper surface and from which extends a converging V-shaped yoke chain 64. Electric wires 65 and 66 extend respectively from the contact rings 57 and 61 to a battery 67 and signal bell 68, as best seen in Figure 1, so that as the weight 60 moves downwardly on the valve stem extension 54, the contact rings 57 and 61 will engage completing the circuits from the battery 67 to the bell 68 causing the bell to ring.

A bracket 69 is secured to the upper portion of the tank T and has an upwardly extending arm 70 positioned in parallel spaced relation to the side of the tank T and extending well above the outer edge of the cover C. A pulley 71 is journalled in the upper end of the arm 70.

A bracket 73 is secured to the tank T in diametrically spaced relation to the bracket 69 and has a pulley 74 journalled therein. A terminal bracket 75 is secured to the tank T adjacent its lower edge so as to underlie the bracket 73. The cover C of the tank T adjacent one side edge thereof is provided with a vent nipple 76. A cover 77 is pivotally mounted to the nipple 76 and has a chain attaching eye 78 secured to its upper face.

A chain 79 extends from the yoke chain 64 over the pulley 71, over the pulley 74, terminating at the bracket 75 to which it is secured. A plurality of fusible links 80 are positioned in the chain 79 at spaced intervals. The chain 79 between the pulleys 71 and 74 extends through the tank T and a seal 81 seals the chain 79 to the tank T to prevent the leakage of gas therearound. A short chain 82 is secured to the eye 78 in the cover 77 and is trained over the pulley 72 and attached to the chain 79 at a point below the pulley 71.

In the use and operation of the invention, the underground tank U is normally empty and connected to a plurality of storage tanks T. In the event that lightning or other means starts a fire within the tank T, the fusible links 80 will melt, severing the chain 79 permitting the weight 60 to move downwardly on the valve stem extension 54 striking the collar 56 to move the valve stem 52 and the valve block 25 downwardly establishing communication between the tank T and the tank U through the trap 32. As the fire burns at the top of the tank T, the inflammable liquid contained therein is drained off into the tank U and the trap 32 prevents the fire from passing through the valve housing 12 and the conduit 48 to ignite the tank U. When the tank T has been drained, the fire will quickly go out since the fuel will be gone.

Simultaneously with the opening of the valve 12, the short chain 82 opens the vent 76 permitting the escape of any gaseous material under pressure within the tank T.

The fusible links 80 in the sections of chain outside of the tank T will serve to actuate the valve mechanism should flames from adjacent burning tanks come dangerously close.

With a tank farm arranged as described above, the multiple tank fires often experienced will be eliminated.

Having thus described the preferred embodiment of the invention, it should be understood that numerous structural modifications and adaptations may be resorted to without departing from the scope of the appended claims.

What is claimed is:

1. An oil tank safety drainage system comprising an oil tank having an upright side wall, a cover for said tank, a drain line secured to said tank at the bottom of said side wall, a valve housing detachably secured to said drain line, a valve in said valve housing, a trap, a conduit connecting said valve housing to said trap, a conduit connecting said trap to an underground storage tank, a chain extending across said tank under said cover, said chain having a plurality of fusible links therein with at least a portion of said fusible links in said chain being positioned in said tank under said cover, said chain being anchored at one end to said tank and supporting at its opposite end means for operating said valve, a vent through the top of said tank, a valve normally closing said vent, and means associated with said chain for opening said vent valve simultaneously upon opening said first named valve.

2. A device as claimed in claim 1 wherein the means for operating said valve comprises a vertical reciprocable weight supported in its upper position by means of said chain.

3. A device as claimed in claim 1 wherein said tank is provided with flexible rubber sealing grommets in the upper portion of the side walls thereof, and said chain extends through said sealing grommets across said tank.

4. A device as claimed in claim 1 wherein said valve housing has an access plate formed on one side thereof detachably secured to said housing whereby said valve may be removed and replaced therethrough and inspected as required.

5. A device as claimed in claim 1 wherein means are associated with said valve for actuating a signaling system for indicating the opening of said valve upon melting of said fusible links.

References Cited in the file of this patent

UNITED STATES PATENTS

| Number | Name | Date |
|---|---|---|
| 169,782 | Dehlinger | Nov. 9, 1875 |
| 1,062,411 | Owrey | May 20, 1913 |
| 1,281,576 | Jacobs | Oct. 15, 1918 |
| 1,308,842 | Clifton | July 8, 1919 |
| 2,091,465 | Belknap | Aug. 31, 1937 |
| 2,203,968 | Ricketts | June 11, 1940 |